Patented Jan. 19, 1932

1,841,445

UNITED STATES PATENT OFFICE

FILIP KAČER, OF MANNHEIM, AND ARTUR KRAUSE, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

PRODUCTION OF NAPHTHALENE DERIVATIVES

No Drawing. Application filed March 31, 1930, Serial No. 440,636, and in Germany April 5, 1929.

The present invention relates to the production of naphthalene derivatives from naphthalenes substituted in the 1-position by an alkyl or aralkyl group by means of carboxylic acid chlorides.

We have found that derivatives of naphthalene which are very valuable industrially are obtained by allowing carboxylic acid chlorides to act according to the Friedel-Crafts reaction on a naphthalene substituted in the 1-position by an alkyl or an aralkyl group and having a free 4-position, or substitution products thereof, such as for example halogen derivatives. In this manner the new 1-alkyl and 1-aralkyl-naphthalene-4-ketones are obtained.

By treating the ketones thus obtained with oxidizing agents the aralkylnaphthalene ketones in case an aromatic carboxylic acid chloride has been used for the condensation, yield 1.4-diketones, in case an aliphatic carboxylic acid chloride has been employed the corresponding 1-aroyl-4-carboxylic acids. Likewise from aliphatic 1-alkylnaphthalene ketones the corresponding 1-alkylnaphthalene-4-carboxylic acids and on further oxidation 1.4-naphthalene-dicarboxylic acids are obtained. Acid as well as alkaline oxidizing agents may be employed, for example alkali metal hypochlorite solutions and nitric acid, the latter being preferably employed for the oxidation of the alkyl groups to carboxylic acid groups. The products thus prepared may be employed among other purposes as initial materials for the manufacture of dyestuffs.

The following examples will further illustrate the nature of this invention but the invention is not restricted to these examples. The parts are by weight.

Example 1

160 parts of powdered aluminium chloride are introduced at 5° C. into a solution of 218 parts of 1-benzylnaphthalene and 145 parts of benzoyl chloride in 520 parts of benzene while stirring continuously. Hydrogen chloride is evolved and the temperature rises to about 30° C. After stirring for from 2 to 3 hours without cooling, whereby the temperature gradually falls again to from 20° to 25° C., the yellow red benzene solution formed is stirred into water in order to decompose the aluminium chloride double compound. The benzene solution is separated and dried with sodium carbonate. By distilling off the benzene at temperatures up to about 150° C. (measured in the liquid) crude 4-benzoyl-1-benzylnaphthalene is obtained.

In order to obtain the product quite pure, the oily product obtained may for example be distilled in vacuo, the crude distillate then being mixed with about the same volume of ether. Crystallization very rapidly takes place, and the pure 4-benzoyl-1-benzylnaphthalene separates out in the form of white crystals having a melting point of about 110° C.

Example 2

50 parts of 4-benzoyl-1-benzylnaphthalene are boiled under a reflux condenser with 400 parts of nitric acid of 40° Bé. strength and 800 parts of water until the evolution of brown gaseous oxides of nitrogen subsides. The pale yellow resin which readily solidifies is then separated off, washed with water and freed from small amounts of alkali-soluble impurities by boiling up with caustic soda solution. The 1.4-dibenzoylnaphthalene thus obtained is already sufficiently pure for most purposes; in order to obtain it in a perfectly pure state it may be crystallized for example from alcohol. From this solvent it crystallizes in white crystals having a melting point of about 106° C. It is very valuable industrially and may readily be converted for example into isodibenzpyrenequinone.

Example 3

400 parts of ground aluminium chloride are introduced while stirring continuously into a solution of 631 parts of 4'-chlorbenzyl-1-naphthalene and 386 parts of benzoyl chloride in 1560 parts of benzene which has been cooled to 5° C., so that the temperature rises to about from 17° to 20° C. In this manner a yellow red solution is formed with the evolution of hydrochloric acid. The solution is stirred for from 2 to 3 hours and is then poured into water in order to decompose the aluminium chloride double compound. The benzene solution is separated off and is dried with sodium carbonate. In order to purify the crude product it is distilled, preferably in vacuo, and the main fraction, of high boiling point, is crystallized from ether. The pure 4-benzoyl-4'-chlorbenzyl-1-naphthalene forms white crystals having a melting point of about 123° C. 4'-chlor-1.4-dibenzoylnaphthalene having a melting point of about 118° C. may be obtained therefrom by oxidation.

When $p$-chlorbenzoyl chloride is employed in this example instead of benzoyl chloride, 4-$p$-chlorbenzoyl-1-$p$-chlorbenzylnaphthalene, and by oxidation 1.4-di-$p$-chlorbenzoylnaphthalene, are respectively obtained.

Example 4

100 parts of ground aluminium chloride are introduced while stirring continuously into a solution cooled to 5° C. of 109 parts of 1-benzylnaphthalene and 59 parts of acetyl chloride in 390 parts of benzene, so that the temperature rises to from about 20° to 22° C. A yellow red solution is formed with the evolution of hydrochloric acid. The solution is stirred in water, the benzene solution separated off and dried with sodium carbonate. In order to obtain the new ketone in a state of purity the crude product is distilled, preferably in vacuo. The main fraction, of high boiling point, is crystallized from alcohol. The melting point of the pure 4-acetyl-1-benzylnaphthalene is about 78° C. By oxidizing this under suitable conditions, for example with dilute nitric acid, 1-benzoyl-4-naphthoic acid having a melting point of about 184° C. is obtained.

Example 5

50 parts of 1-methylnaphthyl-4-phenylketone, obtainable by the action of benzoyl chloride on 1-methyl-naphthalene according to the Friedel-Crafts reaction, are boiled with 750 parts of 20 per cent nitric acid until the evolution of brown gaseous oxides of nitrogen has subsided. The yellow resinous reaction product is then separated and if desired further purified by dissolving in dilute caustic soda solution, the solution being clarified by heating with a little sodium hypochlorite. The solution is filtered and the 4-benzoyl-1-naphthoic acid is precipitated with dilute hydrochloric acid. The product melts at about 184° C. after having been crystallized from glacial acetic acid.

Example 6

75 parts of 1-methylnaphthyl-4-methylketone, obtainable by the action of acetyl chloride on 1-methylnaphthalene according to the Friedel-Crafts reaction, are heated to boiling with 25 parts of soda and 1000 parts of water in an apparatus provided with a descending condenser. Then, while allowing the whole to boil continuously, 1000 parts of a solution of sodium hypochlorite having about 12 per cent of active chlorine are allowed to run in. Chloroform distils over with the steam and in the reaction vessel a solution of sodium 1-methyl-4-naphthoate is obtained. The solution is filtered and the 1-methyl-4-naphthoic acid is precipitated with hydrochloric acid. In the pure state it forms white crystals having a melting point of about 165° C.

If 1500 parts of 20 per cent nitric acid be employed instead of the solution of sodium hypochlorite and the whole be boiled under a reflux condenser until the evolution of brown gaseous oxides of nitrogen subsides, the known naphthalene-1.4-dicarboxylic acid is obtained.

Example 7

800 parts of pulverized aluminium chloride are introduced, while stirring and cooling with ice to between 5° and 10° C., into a solution of 710 parts of $\alpha$-methylnaphthalene and 703 parts of benzoylchloride in 2340 parts of benzene. Hydrogen chloride is evolved and the temperature rises slowly to between 20° and 25° C. Stirring is continued for from 2 to 3 further hours at the said temperature, the whole being then poured onto ice, the benzene solution separated, dried by means of anhydrous soda and the excess of benzene distilled off. In case the remaining oil does not crystallize it is distilled in vacuo and that part boiling between 270° and 280° C. under a pressure of 37 millimeters mercury recovered separately. The crystallizing product is pure 1-methylnaphthyl-4-phenyl ketone.

Example 8

400 parts of aluminium chloride are introduced, while cooling to 10° C., into a solution of 196 parts of acetylchloride in 200 parts of carbon disulphide. Thereupon 284 parts of $\alpha$-methylnaphthalene are run in at between 10° and 20° C., the reaction mixture being stirred for three hours at the said temperature. The yellow crystal pulp obtained is filtered off, washed with carbon disulphide and the residue decomposed in the usual manner by means of water. The oil thus obtained is dried and distilled fractionally. The part passing over at between about 323° to 327° C., is pure 1-methylnaphthyl-4-methyl ketone.

What we claim is:—

1. A process for the production of naphthalene derivatives which comprises acting on a naphthalene containing in the 1-position a substituent selected from the group consisting of alkyl and aralkyl radicles, and having a free 4-position with a carboxylic acid chloride according to the Friedel-Crafts reaction.

2. A process for the production of naphthalene derivatives which comprises acting on 1-benzylnaphthalene with benzoyl chloride according to the Friedel-Crafts reaction.

3. As new articles of manufacture naphthalene derivatives corresponding to the formula:

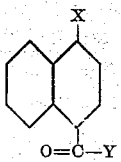

in which X stands for a substituent selected from the group consisting of alkyl and aralkyl radicles, and Y stands for an aliphatic or aromatic radicle.

4. As new articles of manufacture naphthalene derivatives corresponding to the formula:

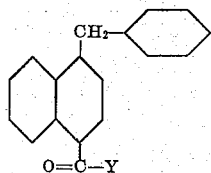

in which Y stands for an aliphatic or aromatic radicle.

5. As new article of manufacture 4-benzoyl-1-benzyl-naphthalene.

In testimony whereof we have hereunto set our hands.

FILIP KAČER.
ARTUR KRAUSE.